US010051568B2

(12) United States Patent
Alon et al.

(10) Patent No.: US 10,051,568 B2
(45) Date of Patent: Aug. 14, 2018

(54) EXTENDING DRX OPERATION IN A HIGH-POWER STATE

(71) Applicant: QUALCOMM Incorporated, San Diego, CA (US)

(72) Inventors: Ofir Alon, Haifa (IL); Valeriya Perelman, Nesher (IL)

(73) Assignee: QUALCOMM, Incorporated, San Diego, CA (US)

( * ) Notice: Subject to any disclaimer, the term of this patent is extended or adjusted under 35 U.S.C. 154(b) by 79 days.

(21) Appl. No.: 15/048,636

(22) Filed: Feb. 19, 2016

(65) Prior Publication Data

US 2017/0118708 A1    Apr. 27, 2017

Related U.S. Application Data

(60) Provisional application No. 62/246,551, filed on Oct. 26, 2015.

(51) Int. Cl.
*G08C 17/00* (2006.01)
*H04W 52/02* (2009.01)

(52) U.S. Cl.
CPC ... *H04W 52/0212* (2013.01); *H04W 52/0216* (2013.01); *Y02D 70/00* (2018.01); *Y02D 70/1242* (2018.01); *Y02D 70/1262* (2018.01); *Y02D 70/142* (2018.01); *Y02D 70/21* (2018.01); *Y02D 70/24* (2018.01); *Y02D 70/26* (2018.01)

(58) Field of Classification Search
CPC ....................... H04W 52/0212; H04W 52/0216
See application file for complete search history.

(56) References Cited

U.S. PATENT DOCUMENTS 8,085,694 B2    12/2011    Wu et al.
8,437,285 B2     5/2013    Jokimies et al.
(Continued)

FOREIGN PATENT DOCUMENTS

EP          2727422 A2    5/2014
WO       2013112733 A1    8/2013

OTHER PUBLICATIONS

International Search Report and Written Opinion—PCT/US2016/048354—ISA/EPO—dated Dec. 8, 2016.
(Continued)

*Primary Examiner* — Afshawn M Towfighi
(74) *Attorney, Agent, or Firm* — Arent Fox, LLP and Qualcomm

(57) ABSTRACT

According to discontinuous reception (DRX), data communication by a communication device occurs at periodic intervals. Between those periodic intervals, the communication device may enter a low-power state. Due to this periodic communication of data, some data may be delayed. Such a delay may be undesirable in various instances. Thus, an apparatus may be configured to determine that the apparatus is scheduled to transition from a first power state to a second power state in association with a DRX cycle. The second power state may be lower than the first power state. The apparatus may be further configured to determine that the first power state of the apparatus is to be extended. The apparatus may be configured to autonomously extend the first power state through transmission of a transaction based on the determination that the first power state of the apparatus is to be extended.

30 Claims, 9 Drawing Sheets

(56) References Cited

U.S. PATENT DOCUMENTS

| | | | |
|---|---|---|---|
| 8,681,724 B2 | 3/2014 | Du et al. | |
| 2004/0039841 A1* | 2/2004 | Logalbo | H04L 61/2084 709/245 |
| 2010/0034145 A1* | 2/2010 | Kim | H04W 52/0216 370/328 |
| 2010/0309798 A1* | 12/2010 | Fodor | H04W 52/06 370/252 |
| 2014/0036748 A1 | 2/2014 | Mukherjee et al. | |
| 2015/0257057 A1* | 9/2015 | Su | H04W 56/0015 370/329 |
| 2017/0048772 A1* | 2/2017 | Gheorghiu | H04W 36/14 |

OTHER PUBLICATIONS

Huang J., et al., "A Close Examination of Performance and Power Characteristics of 4G LTE Networks," Proceedings of the 10th International Conference on Mobile Systems, Applications, and Services, Jun. 25-29, 2012, pp. 225-238.

\* cited by examiner

EXTENDING DRX OPERATION IN A HIGH-POWER STATE

CROSS-REFERENCE TO RELATED APPLICATION(S)

This application claims the benefit of U.S. Provisional Application Ser. No. 62/246,551, entitled "SYSTEM AND METHOD TO EXTEND A HIGH-POWER MODE" and filed on Oct. 26, 2015, which is expressly incorporated by reference herein in its entirety.

BACKGROUND

Field

The present disclosure relates generally to communication systems, and more particularly, to a device configured to extend a high-power state during a discontinuous reception cycle.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various wireless communication systems, discontinuous reception (DRX) may be employed, for example, to conserve power at a communication device. According to DRX, data communication by the communication device occurs at periodic intervals. Between those periodic intervals, the communication device may enter a low-power state, a "sleep" state, or another state in which the communication device conserves power. Due to this periodic communication of data, some data communication may be delayed. Such a delay may be undesirable in various instances, such as during the loading of content from an Internet source (e.g., a web page). To address this undesirable delay, the communication device may perform operations to prevent a transition into a low-power state and/or to extend a periodic interval during which data is communicated.

In an aspect of the disclosure, a method, a computer-readable medium, and an apparatus are provided. The apparatus may be configured to determine that the apparatus is scheduled to transition from a first power state to a second power state in association with a DRX cycle. The second power state may be lower than the first power state. The apparatus may be further configured to determine that the first power state of the apparatus is to be extended. The apparatus may be configured to autonomously extend the first power state through transmission of a transaction based on the determination that the first power state of the apparatus is to be extended.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
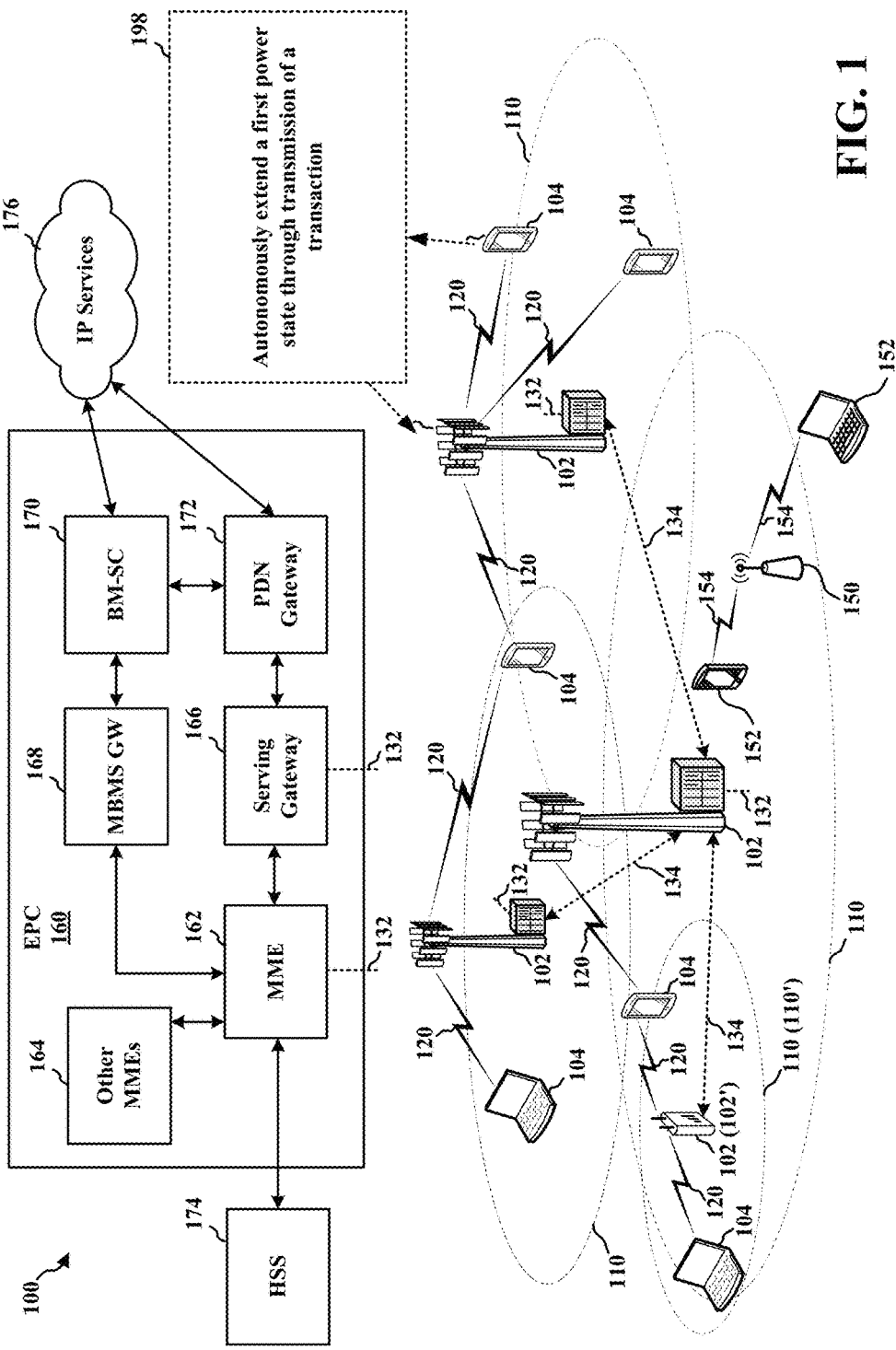
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (e.g., high power cellular base station) and/or small cells (e.g., low power cellular base station). The macro cells may include eNBs. The small cells may include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to autonomously extend a first power state through transmission of a transaction (198) to the base station 102. According to aspects, the UE 104 may be configured to determine that the UE 104 is scheduled to transition from a first power state to a second power state in association with a discontinuous reception (DRX) cycle. The second power state may be lower than the first power state. The UE 104 may be further configured to determine that the first power state of the UE 104 is to be extended. The UE 104 may be configured to autonomously extend the first power state through transmission of a transaction (198), to the base station 102, based on the determination that the first power state of the apparatus is to be extended.

Figure 2:
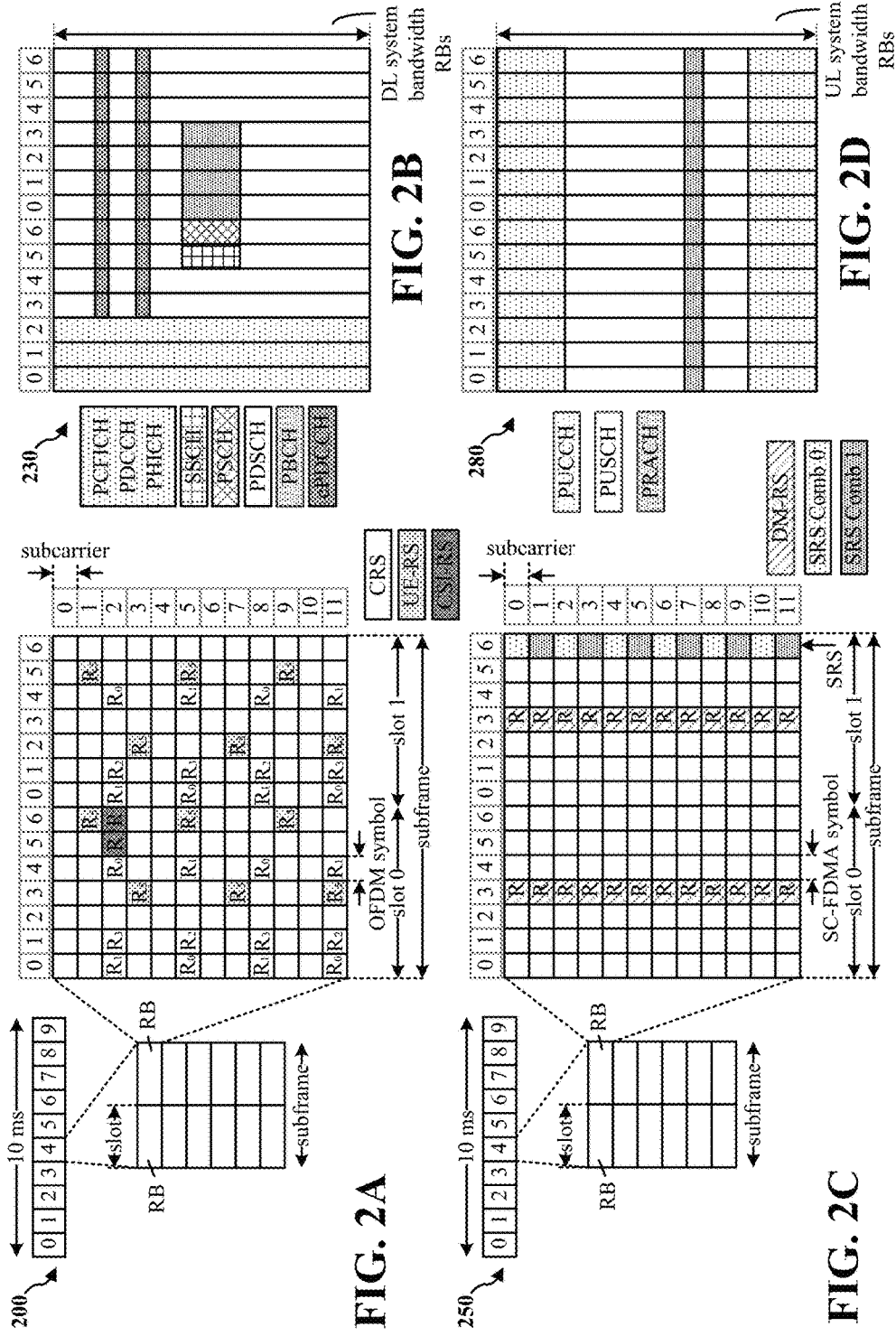
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
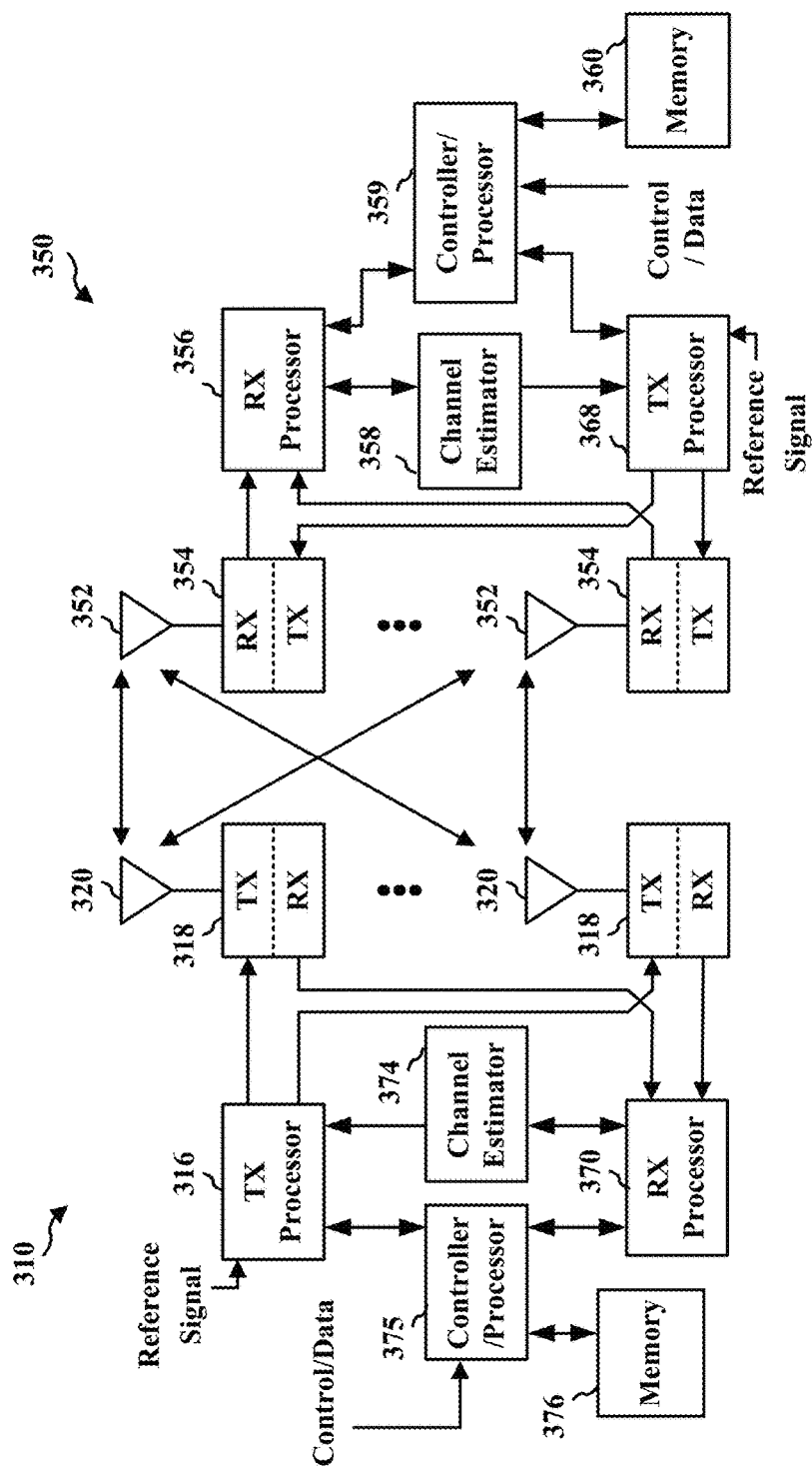
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
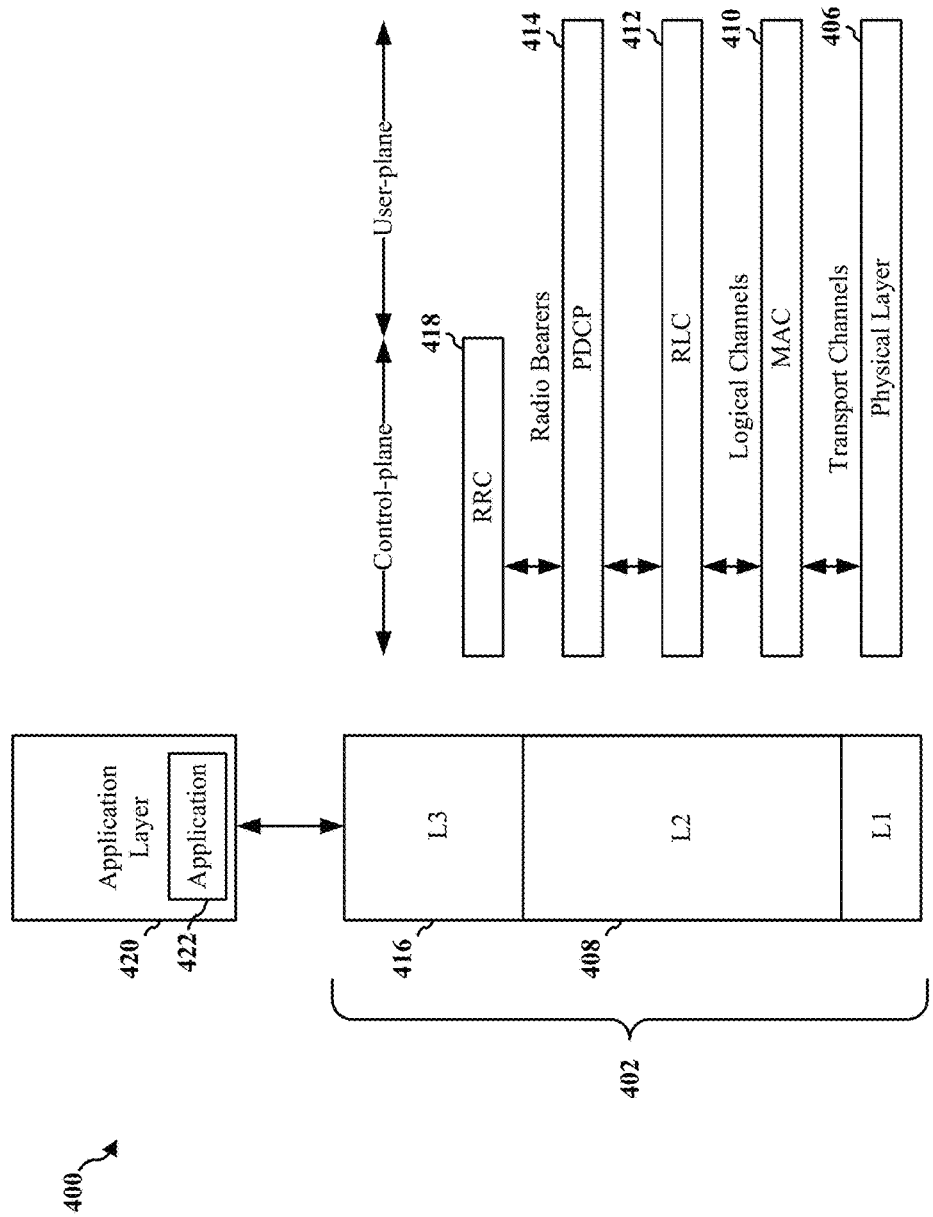
FIG. 4 is a diagram illustrating an example of a protocol architecture for a UE.

Turning to FIG. 4, a diagram illustrates an example of a protocol architecture 400 for a UE, such as the UE 104 of FIG. 1 and/or the UE 350 of FIG. 3. The protocol architecture 400 includes at least an application layer 420 and a radio protocol stack 402. The radio protocol stack 402 for the UE is shown with three layers: Layer 1, Layer 2, and Layer 3. The Layer 1 (L1 layer) is the lowest layer and implements various physical layer signal processing functions. The L1 layer is referred to herein as the physical layer 406. In aspects, a modem may implement at least operations associated with the physical layer 406. The Layer 2 (L2 layer) 408 is above the physical layer 406 and is responsible for the link between the UE and eNB over the physical layer 406.

In the user plane, the L2 layer 408 includes a media access control (MAC) sublayer 410, a radio link control (RLC) sublayer 412, and a packet data convergence protocol (PDCP) sublayer 414. In aspects, a baseband processor may implement one or more of the MAC sublayer 410, RLC sublayer 412, and/or PDCP sublayer 414 of the L2 layer 408 (although a baseband processor may also implement at least a portion of the physical layer 406). Further, the L2 layer 408 may cause various operations that affect the physical layer 406.

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol stack 402 for the UE is substantially the same for the physical layer 406 and the L2 layer 408 with the exception that there is no header compression function for the control plane. The control plane also includes a radio resource control (RRC) sublayer 418 in Layer 3 (L3 layer) 416. The RRC sublayer 418 is responsible for obtaining radio resources (e.g., radio bearers) and for configuring the lower layers using RRC signaling between the eNB and the UE.

At the UE, an application layer 420 terminates the end of a connection (e.g., a connection between the UE and a base station, a far-end UE, server, etc.). Although not shown, the UE may have several other layers below the application layer 420, including a network layer (e.g., IP layer) and/or an NAS layer, which may be included in the radio protocol stack 402.

According to aspects, communication is initiated and reflected at the application layer 420. The application layer 420 may be configured to generate and receive data that is passed down and up the radio protocol stack 402 for transmission/reception over a RAN. The application layer 420 may include one or more applications (e.g., the application 422) configured to generate, display, or otherwise process data as both the initiation point and terminal point for such data. In aspects, a processor (e.g., an application processor) may implement the application layer 420.

In one aspect, the application layer 420 may include an application (e.g., the application 422) that serves as point of origination and/or destination for data sent and/or received over a RAN. Examples of the application 422 may include a web browser, a social media application, a messaging application, a media application (e.g., a streaming video application), or any other application that originates and/or terminates data communicated over a RAN. In another aspect, the application 422 may operate in association with one of the aforementioned exemplary applications. For example, the application 422 may be a utility application or a plug-in application, which may communicate or integrate with one of the aforementioned exemplary applications (although not necessarily).

A UE (e.g., the UE 104 and/or the UE 350) including the protocol architecture 400 may employ discontinuous reception (DRX), for example, to conserve power at the UE. According to DRX, data communication cyclically occurs at intervals. Between those intervals, the UE may enter a low-power state, a "sleep" state, or similar power-conservation state in which data reception by the UE is paused or suspended. In an aspect, the UE may be operating in a connected mode with a base station (e.g., the base station 102 and/or the eNB 310), such as an RRC connected state. Where the UE is operating in an RRC connected state, the DRX mode may be connected DRX (CDRX), for example, as defined by one or more technical specifications promulgated by 3GPP for wireless communication standards (e.g., LTE, LTE-A, and the like).

In aspects, one or more layers 406, 408, 416 (e.g., the L2 layer 408 and, in particular, the MAC sublayer 410) of the radio protocol stack 402 may implement DRX (e.g., the receive chain of the L2 layer 408 and/or the physical layer 406 may transition to a low-power state or a "sleep" state during which signal reception and processing is suspended). Due to DRX, data may be delayed in reaching the application layer 420. Such a delay may be undesirable for the application 422—e.g., DRX may protract the duration for a web browser to establish an interactive portion of a web site.

In effect, the application layer 420 may be indirectly affected by DRX due to the suspension of data reception; however, the application layer 420 may not implement or observe DRX. For example, the application 422 may not transition to a low-power state or "sleep" state. Because the delay in data reception may be undesirable to the application 422, the application 422 may perform operations to prevent a transition to a low-power state—e.g., the application 422 may cause the UE to autonomously extend a high-power state during which the one or more layers of the radio protocol stack 402 continue to receive and process data.

According to an aspect, the application 422 may determine that the UE is scheduled to transition from a high-power state to a low-power state in association with DRX. For example, the application 422 may determine a duration of an inactivity timer associated with DRX. In other words, the application 422 may determine the time until one or more layers 406, 408, 416 of the radio protocol stack 402 transitions from a high-power state, during which data is received and passed up the radio protocol stack 402 to the application layer 420, to a low-power state, during which data reception is suspended.

According to an aspect, the application 422 may determine that the high-power state is to be extended. In effect, the application 422 may determine that data reception and processing through one or more layers 406, 408, 416 of the radio protocol stack 402 should continue.

In one example, the application 422 may determine that the high-power state is to be extended in association with transmission of a request. For example, the application 422 may cause transmission of a request or detect transmission of a request by another application. Examples of requests include Hyper Text Transfer Protocol (HTTP) requests, HTTP Secure (HTTPS) requests, HTTP2 requests, Transmission Control Protocol (TCP) requests, Domain Name System (DNS) requests, or essentially any other request that may be transmitted over a network.

The application 422 may expect one or more responses (e.g., a response from a server, an Internet resource, and the like) based on one or more transmitted requests. Examples of responses include HTTP responses, HTTPS responses, HTTP2 responses, TCP responses, DNS responses, or essentially any other response that may be transmitted over a network.

The application 422 may determine that the high-power state is to be extended until one or more sufficient responses are received. For example, the application 422 may determine that the high-power state is to be extended until one or more responses that allow interactivity with the application 422 are delivered to the application layer 420. Illustratively, the application 422 may be a web browser and the application 422 may determine that the high-power state is to be extended until a requested web page becomes interactive.

Based on the determination that the high-power state is to be extended, the application 422 may cause transmission of a transaction. In other words, the UE may autonomously extend the high-power state through transmission of a transaction based on the determination that the high-power state of the UE is to be extended. That is, the UE may not negotiate with a base station (e.g., the base station 102 and/or the eNB 310) for DRX parameters—e.g., the UE may not expect a response to the transaction, such as an acknowledgement. Rather, the UE may operate in conformance with the DRX parameters provided by the base station (e.g., the base station 102 and/or the eNB 310). However, the UE may assume that the transaction causes the base station to continue data transmission to the UE because the transaction informs (e.g., indirectly or implicitly informs) the base station that the UE will remain in the high-power state.

According to aspects, the application 422 may send the transaction through the radio protocol stack 402 for transmission over a RAN. Because one or more layers 406, 408, 416 (e.g., the physical layer 406 and/or the L2 layer 408) of the radio protocol stack 402 process the transaction and cause transmission thereof over the RAN, the transaction may cause the one or more layers 406, 408, 416 of the radio protocol stack 402 to remain in the high-power state. At the base station side (e.g., the base station 102 and/or the eNB 310), the transaction may cause the base station to continue transmission of data to the UE because the transaction may indicate that the UE remains in the high-power state in anticipation of one or more responses.

According to aspects, the transaction itself may not elicit a response; however, transmission of the transaction prevents one or more layers 406, 408, 416 of the radio protocol stack 402 from transitioning to the low-power state and further prevents the base station from suspending transmission of data to the UE. For example, transmission of the transaction may allow one or more responses to one or more requests to be received at the application layer 420 with reduced delay commensurate with DRX cycles.

In one aspect, the application 422 may generate a transaction based on the determination that the high-power state is to be extended and transmit the transaction to a base station (e.g., the base station 102 and/or the eNB 310). Examples of transactions include Address Resolution Protocol (ARP) requests, pings to a gateway (e.g., the Serving Gateway 166, the MBMS Gateway 168, and/or the PDN Gateway 172), messages intended for a base station, or other similar messages that indicate the UE will remain in a high-power state in anticipation of one or more responses.

Although aspects described herein may reference various operations performed at specific layers of the protocol architecture 400, the present disclosure comprehends implementations in which one or more other layers of a UE autonomously extend a high-power state through transmission of a transaction. For example, a UE may not necessarily autonomously extend the high-power state through transmission of a transaction at an application layer 420; rather, all or part of an implementation of an autonomous extension of a high-power state may be achieved at the L3 layer 416 and/or the L2 layer 408.

Figure 5:
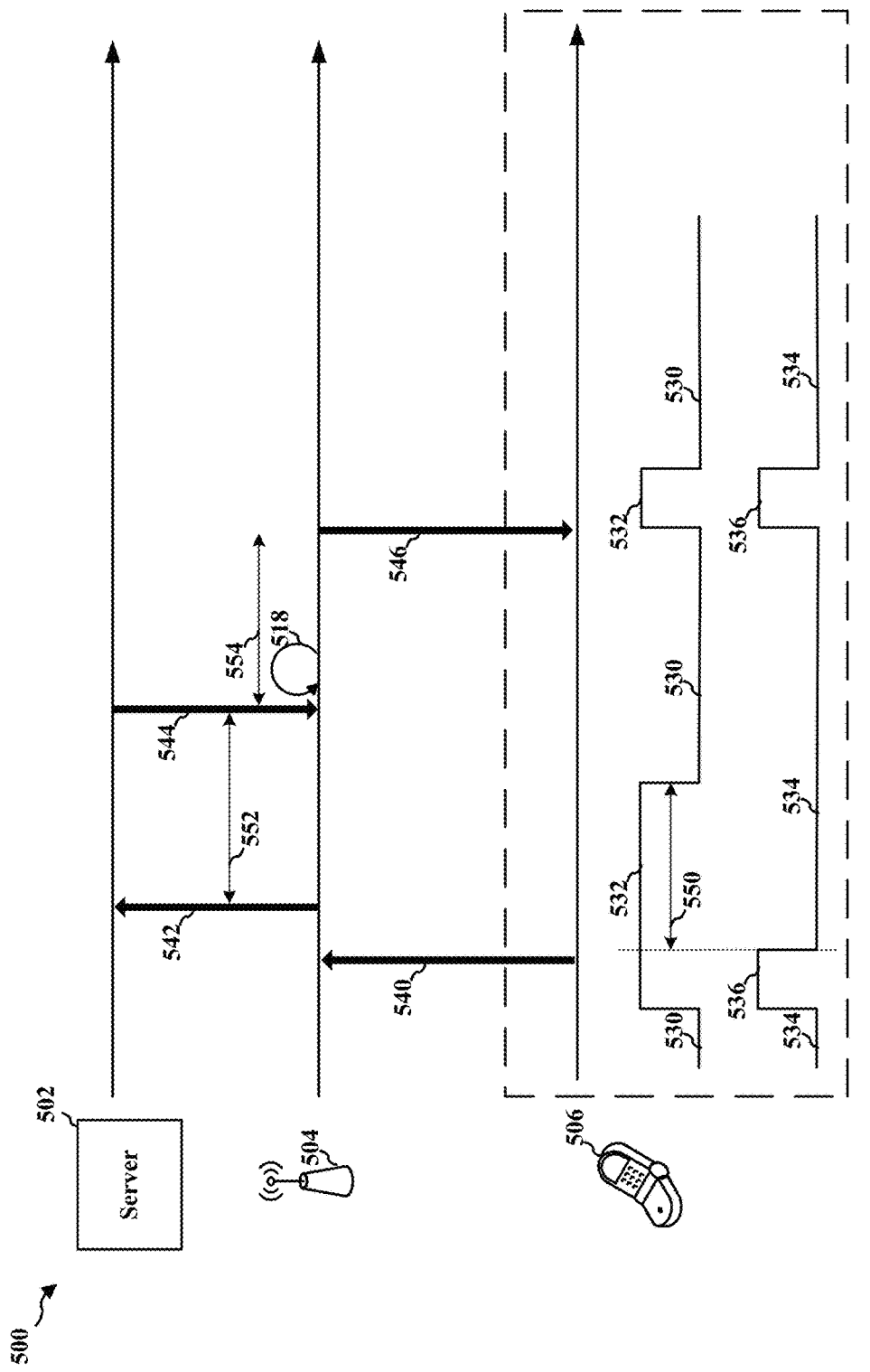
FIG. 5 is a block diagram of a wireless communication environment including a server, a base station, and a UE.

With reference to FIG. 5, a block diagram illustrates an example of a wireless communication environment 500 including a server 502, a base station 504, and a UE 506, according to various aspects. In various aspects, the UE 506 may be the UE 104 of FIG. 1 and/or the UE 350 of FIG. 3. In one aspect, the UE 506 may include the protocol architecture 400 of FIG. 4. In various aspects, the base station 504 may be the base station 102 of FIG. 1 and/or the eNB 310 of FIG. 3.

The base station 504 and the UE 506 may communicate using DRX cycles, for example, to conserve power (e.g., battery life) of the UE 506. DRX allows the UE 506 to transition between a high-power state and a low-power state. In one aspect, the DRX mode may be CDRX.

DRX may be managed by the base station 504 for the UE 506. Thus, the base station 504 may be aware of the DRX cycles at the UE 506, such as intervals during which the L2 layer 408 of the UE 506 is operating in a high-power state and intervals during which the L2 layer 408 of the UE 506 is operating in a low-power state. During the high-power state, the base station 504 may transmit signals to the UE 506 and, accordingly, the UE 506 may receive signals from the base station 504. During the low-power state, the base station 504 may refrain from (e.g., delay) transmitting signals to the UE 506.

In an aspect, the base station 504 may transmit to the UE 506 one or more parameters associated with DRX. For example, the base station 504 may signal to the UE 506 one or more parameters associated with activation of DRX, deactivation of DRX, a duration of a high-power state, a duration of a low-power state, and/or any other number of parameters associated with DRX. In an aspect, the one or more parameters may be provided to the base station 504 (e.g., by a core network). In an aspect, the parameters define DRX operation at the UE 506. In other words, the UE 506 operates in conformity with the parameters transmitted thereto by the base station 504, for example, as a consequence of operating in compliance with a wireless communication standard (e.g., LTE, LTE-A, and the like).

According to various aspects, the base station 504 may signal to the UE 506 one or more parameters that activate DRX at the UE 506 and define durations of cycles associated with DRX. The DRX cycles may include inactive cycles 534 (e.g., periods during which the UE 506 does not receive) and active cycles 536 (e.g., periods during which the UE 506 is to receive). Consistent with the DRX cycles 534, 536, the UE 506 may alternatingly operate in a low-power state 530 (e.g., during which the UE 506 does not receive) or a high-power state 532 (e.g., during which the UE 506 is to receive). For example, the L2 layer 408 may alternatingly cause operation in the receive chain of the radio protocol stack 402 in a low-power state 530 or a high-power state 532.

The UE 506 may transmit a request 540 to the base station 504. For example, the UE 506 may transmit a request associated with a resource available over the Internet, such as a HTTP request, a HTTPS request, a HTTP2 request, a TCP request, or a DNS request.

In an aspect, the UE 506 may transmit the request 540, which may be transmitted during an active cycle 536 during which the L2 layer 408 of the UE 506 is in a high-power state 532 (although not necessarily so). In an aspect, the UE 506 may remain in the high-power state 532 after transmission of the request 540 for a duration 550, for example, in anticipation of a response to the request 540. For example, the L2 layer 408 of the UE 506 may cause the receive chain of the radio protocol stack 402 to remain in the high-power state 532 after transmission of the request 540 for a duration 550. Thus, the UE 506 may remain in the high-power state 532 after an active cycle 536 has elapsed. The duration 550 may be defined by a timer, such as a timer having a duration set by a parameter provided by the base station 504. However, the UE 506 may not receive a response to the request 540 before the duration 550 has elapsed and, consequently, the UE 506 may transition to a low-power state 530 consistent with the inactive cycle 534 (e.g., the L2 layer 408 of the UE 506 may cause the receive chain of the radio protocol stack 402 to transition to a low-power state 530).

Based on the request 540, the base station 504 may transmit a request 542 to a server 502 (e.g., an Internet server). The server 502 may transmit a response 544 to the base station 504. However, a delay period 552 may occur between the request 542 and the response 544, for example, due to transmission trip time of the request 542 and the response 544 and/or processing time at the server 502 (and/or another network entity with which the server 502 may interact to fulfill the request 542).

In association with the DRX cycles 534, 536, the base station 504 may perform an operation 518 to determine that the UE 506 is in a low-power state 530 when the response 544 is received. Thus, at operation 518, the base station 504 may delay responding to the request 540 until the next active cycle 536 during which the UE 506 is in a high-power state 532. Following this delay period 554, the base station 504 may transmit, to the UE 506, a response 546 to the request 540. As a consequence of the DRX cycles 534, 536, the UE 506 may experience an additional period of delay commensurate with the duration of the delay period 554. Such a delay in receiving the response 546 may affect one or more metrics, such as one or more key performance indicators (KPIs) indicative of performance of the UE 506 and/or performance of a resource loaded at the UE 506 (e.g., a web page). In some instances, power conservation may be desirably secondary to operations at the UE 506, such as operations dependent upon the response 546.

Figure 6:
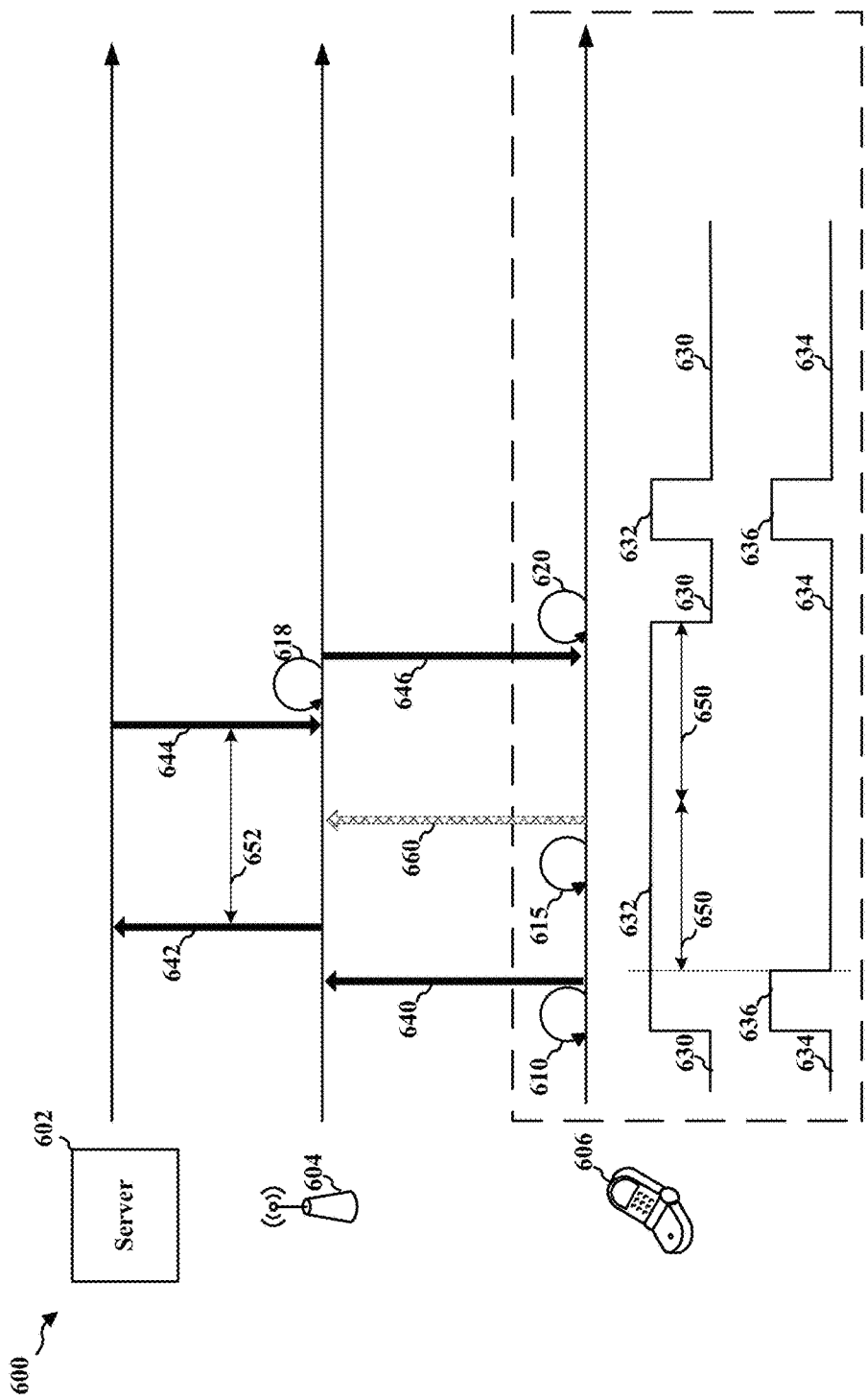
FIG. 6 is a block diagram of a wireless communication environment including a server, a base station, and a UE in which the UE may extend a high-power state of the UE.

Next, FIG. 6 illustrates a block diagram of a wireless communication environment 600 including a server 602, a base station 604, and a UE 606 that may extend a high-power state 632, according to various aspects. The wireless communication environment may be similar to and/or may be another aspect of the wireless communication environment 500 illustrated in FIG. 5. As such, the base station 604 may be an aspect of the base station 504 and the server 602 may be an aspect of the server 502. The UE 606 may be configured to operate according to DRX in a manner similar to that described with respect to the UE 506; however, the UE 606 may be configured to extend a high-power state 632. For example, the UE 606 may implement all or part of the protocol architecture 400 described in FIG. 4 (e.g., the L2 layer 408 may implement DRX at the UE 606).

In aspects, the base station 604 and the UE 606 may communicate using DRX cycles having active cycles 636 and inactive cycles 634. Accordingly, the base station 604 may transmit signals to the UE 606 during a high-power state 632 of the UE 606 and may refrain from (e.g., delay) transmitting signals to the UE 606 during a low-power state 630 of the UE 606. In aspects, the L2 layer 408 (e.g., the MAC sublayer 410) of the UE 606 may implement DRX and, therefore, may alternatingly cause operation in the receive chain of the radio protocol stack 402 in a low-power state 630 or a high-power state 632. In an aspect, the DRX mode may be CDRX.

In an aspect, the UE 606 may perform an operation 610 at which the UE 606 determines that the UE 606 desires a resource (e.g., an Internet resource, a resource from the base station 604, a resource from a core network, or essentially any other resource retrievable over a wireless network). Thus, in connection with operation 610, the UE 606 may generate and transmit a request 640. For example, the application 422 of the UE 606 may cause transmission of a request 640 when the application 422 determines that an Internet resource is desired in association with operation 610.

In an aspect, the UE 606 may transmit the request 640. In an aspect, the UE 606 may remain in the high-power state 632 after transmission of the request 640 for a duration 650, for example, in anticipation of a response to the request 640. For example, the L2 layer 408 of the UE 606 may remain in the high-power state 632 after an active cycle 636 has elapsed. The duration 650 may be defined by a first timer, such as an inactivity timer associated with DRX and having a duration set by a parameter provided by the base station 604. However, the UE 606 may not receive a response to a request 640 before the duration 650 has elapsed.

Based on the request 640, the base station 604 may transmit a request 642 to the server 602 (e.g., an Internet server). The server 602 may transmit a response 644 to the base station 604. However, a delay period 652 may occur between the request 642 and the response 644, for example, due to transmission trip time of the request 642 and the response 644 and/or processing time at the server 602 (and/or another network entity with which the server 602 may interact to fulfill the request 642). During the delay period 652, the UE 606 may be scheduled to transition to the low-power state 630 in association with DRX. For example, the L2 layer 408 of the UE 606 may be scheduled to transition the receive chain of the radio protocol stack 402 to the low-power state 630. However, this transition to the low-power state 630 may undesirably increase the time to reception of a response at the UE 606.

Thus at operation 615, the UE 606 may determine that the UE 606 is scheduled to transition from the high-power state 632 to the low-power state 630 in association with the DRX cycles 634, 636. For example, the application 422 of the UE 606 may determine that the L2 layer 408 of the UE 606 is scheduled to transition the receive chain from the high-power state 632 to the low-power state 630 in association with the DRX cycles 634, 636.

Further to operation 615, the UE 606 may determine that the high-power state 632 of the UE 606 is to be extended. For example, the application 422 of the UE 606 may determine that the L2 layer 408 should maintain the high-power state 632 of the receive chain of the radio protocol stack 402. In aspects, the UE 606 may anticipate and/or desire reception of a response to the request 640 before a next active cycle 636, such as to improve KPIs associated with performance of the UE 606 and/or a resource loaded at the UE 606 (e.g., a web page).

In various aspects, the determination that the high-power state 632 of the UE 606 is to be extended may be based on current operations of the UE 606. For example, the application 422 operating at the UE 606 (e.g., an application running in the foreground) may indicate a desire to extend the high-power state 632 by the L2 layer 408.

According some aspects, the determination that the high-power state 632 of the UE 606 is to be extended may be based on the request 640. In an aspect, the UE 606 may be aware that a response to the request 640 is pending and, therefore, the UE 606 desires to extend the high-power state 632 of the UE 606. For example, the request 640 may include an indication that the request 640 is urgent or of a high priority and, therefore, the UE 606 may desire to extend the high-power state 632 in anticipation of a response to the request 640.

In various aspects, the UE 606 may start a second timer in association with the determination that the UE 606 is scheduled to transition from the high-power state 632 to the low-power state 630 (and/or in association with the determination that the high-power state 632 of the UE 606 is to be extended). In an aspect, this second timer may be of a shorter duration than the duration 650, for example, to prevent the UE 606 from transitioning to the low-power state 630. The duration of the second timer may be set by the UE 606 or may be a predefined value—for example, the application 422 of the UE 606 may set the duration of the second timer and/or access the duration of the second timer from a stored value.

In one aspect, the second timer may be based on the first timer. For example, operation 615 may be performed at the L2 layer 408, at which the duration 650 of the first timer may be available. In another aspect, a duration 650 of the first timer may be obtainable by another layer (e.g., the application 422 of the application layer 420) and/or another processor (e.g., an application processor) that is configured to interface with the L2 layer 408 of the UE 606 to determine a duration 650 of the first timer.

According to another aspect, the second timer may be estimated with respect to a duration 650. For example, at operation 615, the UE 606 may observe a duration 650 between the time at which a request is transmitted and a time at which the L2 layer 408 causes a transition to the low-power state 630. Responsively, the UE 606 may set a duration of the second timer based on the observation of a duration 650.

In another aspect, the UE 606 may set a duration of a second timer based on an estimated time to receive a response to a request. For example, the UE 606 may estimate a time to receive a response to the request 640 (e.g., round trip time (RTT)) and may determine that the UE 606 is to remain in the high-power state 632 during the interval of that estimated time to response. In another example, the UE 606 may estimate a time to receive a response to the request 640 (e.g., based on observation of one or more RTTs) and may determine that that the UE 606 is not to be prevented from moving to the low-power state 630 prior to the expiration of the second timer (e.g., estimated time of response) and is to be moved to the high-power state 632 upon expiration of the second timer (e.g., estimated time of response). In other words, the estimated time to receive a response may span a plurality of active cycles 636 and/or inactive cycles 634 and, during the estimated time to receive a response, the UE 606 may transition to the low-power state 630 but may transmit the transaction 660 to cause the UE 606 to transition from the low-power state 630 to the high-power state 632 at a time that is proximate to the estimated time to receive a response (e.g., at expiration of the second timer). For example, the application 422 may allow the L2 layer 408 to cause the transition to the low-power state 630, but may transmit the transaction 660 to cause the L2 layer 408 to transition the receive chain of the radio protocol stack 402 from the low-power state 630 to the high-power state 632 at a time that is proximate to the estimated time to receive a response.

Further to operation 615, the UE 606 may transmit a transaction 660 based on the determination that the high-power state 632 of the UE 606 is to be extended. In an aspect in which the determination that the high-power state 632 of the UE 606 is to be extended is based on the second timer, the UE 606 may transmit the transaction 660 at expiration of the second timer. In effect, the UE 606 may autonomously extend the high-power state 632 of the UE 606 based on transmission of the transaction 660.

According to various aspects, the transaction 660 may prevent the L2 layer 408 from causing a transition to the low-power state 630 during an inactive cycle 634 of the DRX cycles. Practically, the transaction 660 informs the base station 604 that the UE 606 is active and the UE 606 is to remain in the high-power state 632 for a duration 650 subsequent to the transmission of the transaction 660 to the base station 604.

Based on the transaction 660, the base station 604 may determine that the UE 606 may continue to receive signals from the base station 604 at least for the duration 650 subsequent to transmission, by the UE 606, of the transaction 660. The UE 606 may assume that the base station 604 will continue to transmit signals to the UE 606 based on the transaction 660. For example, the application 422 may continue operation with the assumption that the transmission of the transaction 660 causes the L2 layer 408 to extend the high-power state 632.

In one aspect, the transmission of the transaction 660 may autonomously extend the high-power state 632 without negotiation with the base station 604. In effect, while the base station 604 is responsible for providing DRX parameters to the UE 606, the UE 606 may continue to operate in conformance with these DRX parameters but still extend the high-power state 632 based on transmission of the transaction 660. For example, the transaction 660 may not be a request to the base station 604 to modify or renegotiate DRX parameters, such as a duration 650 of a high-power state 632. Rather, the transaction 660 may inform the base station that the UE 606 will remain in the high-power state 632. Therefore, the UE 606 may autonomously extend the high-power state 632 based on transmission of the transaction 660.

In one aspect, the UE 606 may generate the transaction 660 in connection with operation 615. For example, the UE 606 may generate the transaction 660 based on the determination that the high-power state 632 of the UE 606 is to be extended.

The transaction 660 may vary according to different aspects. In one aspect, the transaction 660 may implicitly inform the base station 604 that the UE 606 is active, and thus the UE 606 will remain in the high-power state 632. In other words, the transaction 660 may traverse through the base station but may not be addressed thereto. For example, the transaction 660 may be a ping, such as a ping to a gateway (or another Internet device). As such, the transaction 660 may include an IP address of the server 602 (or other Internet device). In another example, the transaction 660 may be an ARP request.

According to other aspects, the transaction 660 may be intended for the base station 604. For example, the transaction 660 may be a message to explicitly inform the base station 604 of the extension of the high-power state 632 of the UE 606, which may decrease the time to reception of a response 646.

In various aspects, the UE 606 may not anticipate a response to the transaction 660. Because the UE 606 autonomously extends the high-power state 632 through transmission of the transaction 660, the UE 606 may remain in the high-power state 632 without receiving an indication from the base station 604 that the base station 604 acknowledges the extension of the high-power state 632 of the UE 606.

At the base station 604, a response 644 to the request 642 may be received. Because the transaction 660 informs the base station 604 that the UE 606 remains active and, therefore, the UE 606 remains in the high-power state 632 even during the inactive cycle 634, the base station 604 may determine that the base station 604 may transmit data to the UE 606 at operation 618. Accordingly, the base station 604 may transmit, to the UE 606, a response 646 to the request 640 without waiting for a subsequent active cycle 636. Thus, a delay period between when the base station 604 is ready to transmit a response and a next active cycle 636 may be reduced or eliminated. For example, in the context of FIG. 5, the delay period 554 may be reduced or eliminated.

Although FIG. 6 illustrates one transaction 660, similar techniques as described in the present disclosure may be applied to transmit a plurality of transactions similar to the transaction 660. For example, the UE 606 may issue a plurality of requests similar to the request 640 and may transmit a plurality of transactions similar to the transaction 660 to extend a high-power state 632 of the UE 606 in anticipation of a plurality of responses similar to the response 646. However, where the UE 606 contemporaneously transmits a plurality of requests, a fewer number of transactions may satisfactorily extend the high-power state 632 of the UE 606. In other words, each request does not necessarily require a corresponding transaction, as a single transaction may extend the high-power state 632 of the UE 606 so that the UE 606 is able to receive a plurality of responses to a plurality of requests.

Perpetual transmission of requests by the UE 606 may undesirably affect power consumption (e.g., reduce battery life). To that end, the UE 606 may determine that the UE 606 is to transition to the low-power state 630 at operation 620. Further to operation 620, the UE 606 may refrain from transmitting additional transactions based on the determination that the UE 606 is to transition to the low-power state 630. For example, the application 422 may determine that the L2 layer 408 should cause the receive chain of the radio protocol stack 402 to transition to the low-power state 630 and, therefore, may refrain from causing transmission of additional transactions.

In one aspect, the UE 606 may maintain a count of the number of transactions transmitted to extend the high-power state 632 of the UE 606 (e.g., a number of transactions transmitted during a given interval, a number of transactions transmitted during a given high-power state 632, and the like). The UE 606 may compare the number of transactions to a threshold (e.g., a predefined threshold). If the number of transactions meets or exceeds the threshold, then the UE 606 may determine that the UE 606 is to transition to the low-power state 630 and, therefore, may refrain from transmitting additional transactions.

In another aspect, the UE 606 may determine that the UE 606 is to transition to the low-power state 630 based on a specific event. According to one aspect, the UE 606 may determine that the response 646 is a sufficient response for the current operation of the UE 606 and, therefore, the UE 606 may transition to the low-power state 630. For example, the application 422 of the UE 606 may determine that the L2 layer 408 may cause the transition to the low-power state 630 at a specific point during which an Internet resource is loaded by the application 422, such as when a web page loaded by the application 422 becomes interactive in association with reception of the response 646.

Based on detection of that specific point (e.g., reception of the response 646, processing of the response 646, and the like), the UE 606 may determine that the UE 606 is to transition to the low-power state 630 and, therefore, may refrain from transmitting additional transactions. For example, the application 422 may allow the L2 layer 408 to cause the transition from the high-power state 632 to the low-power state 630 in conformance with the DRX cycles 634, 636.

The present disclosure may describe operations 610, 615, 620 of the UE 606 with reference to one or more layers that are to perform these operations 610, 615, 620. One of ordinary skill would appreciate that operations 610, 615, 620 may be performed at any layer and/or by any processor. For example, operations 610, 615, 620 may be performed at the application layer 420 and/or by an application processor in one aspect. In another aspect, operations 610, 615, 620 may be performed at the L2 layer 408, the L3 layer 416, and/or by a baseband processor.

Further, although aspects described herein are described with respect to a base station and a UE, a UE (e.g., the UE 104, the UE 350, and/or UE 606) may operate in a DRX mode in communication with another wireless communication apparatus, such as another UE. Accordingly, aspects described herein with respect to autonomously extending a high-power state of a UE during DRX cycles may be applicable to device-to-device (D2D) and/or Internet of Things (IoT) communication techniques. For example, the UE 606 may transmit the request 640 to a machine-type communication (MTC) UE and, in connection therewith, transmit a transaction 660 (e.g., to the MTC UE) to extend a high-power state of the UE 606 in anticipation of a response from the MTC UE.

Figure 7:
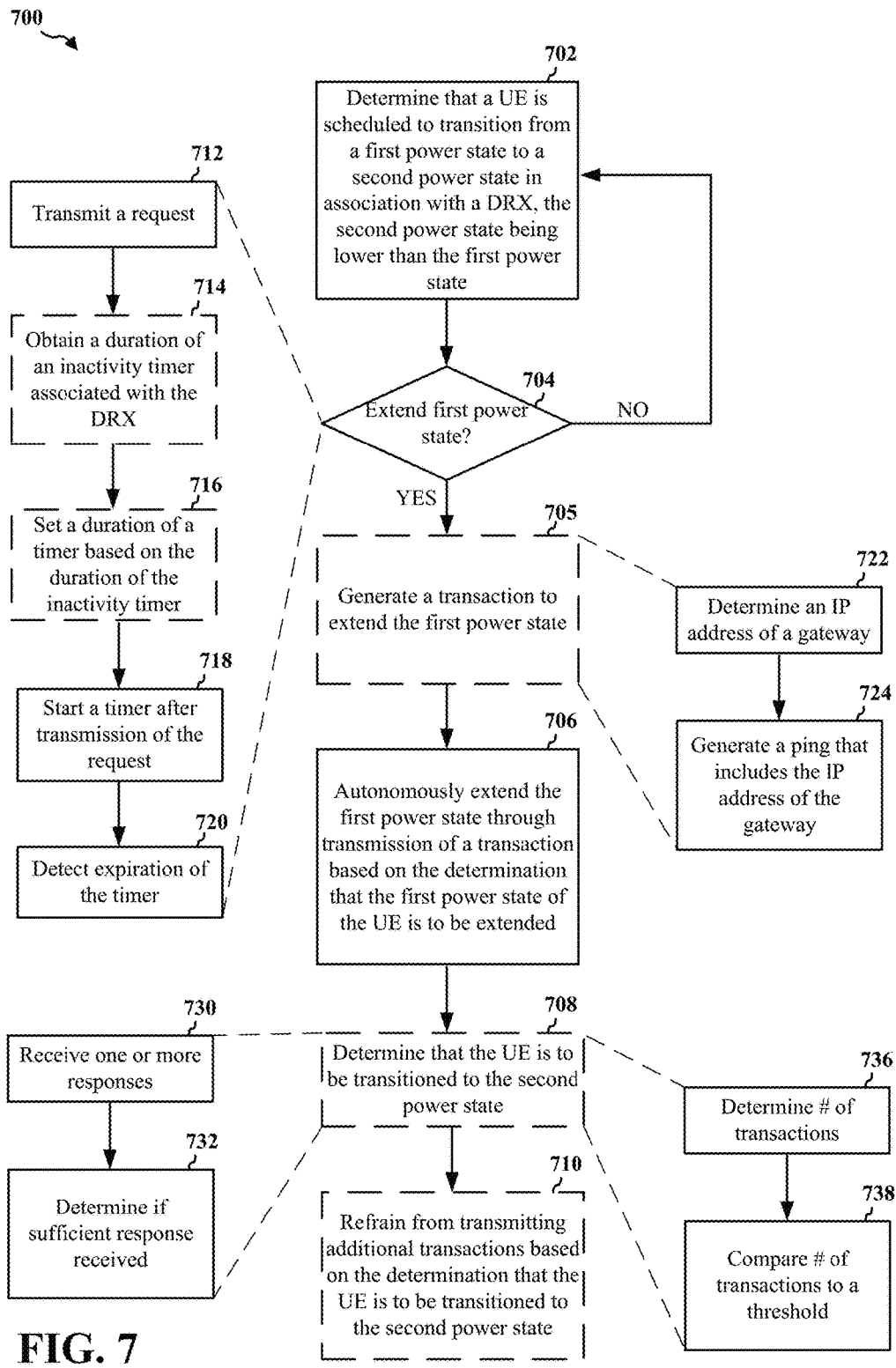
FIG. 7 is a flowchart of a method of wireless communication.

Now with reference to FIG. 7, a flowchart illustrates a method 700 for autonomously extending a first power state of a UE. In various aspects, the first power state may be a higher power state than the second power state. The first and second power states of the UE may be power states associated with a receive chain of the UE, such as power states associated with DRX (e.g., CDRX). The first and second power states may be effected by an L2 layer and, in particular, a MAC sublayer, such as the MAC sublayer 410 of FIG. 4. The method 700 may be performed by a UE, such as the UE 606 of FIG. 6 and/or a UE including the protocol architecture 400 of FIG. 4.

In FIG. 7, various operations are illustrated as optional (e.g., denoted by dashed lines). However, the present disclosure contemplates operations in which one or more operations of the method 700 are optional, omitted, and/or alternatively performed according to various aspects. Further, one or more operations of the method 700 may be transposed and/or contemporaneously performed.

The method 700 may begin with an operation 702 at which a UE may determine that the UE is scheduled to transition from the first power state to the second power state in association with DRX (e.g., CDRX). In the context of FIG. 4, the application 422 may determine that the L2 layer 408 (e.g., the MAC sublayer 410) is scheduled to cause the transition from a first power state to a second power state. In the context of FIG. 6, the UE 606 may perform operation 615 to determine that the UE 606 is scheduled to transition from the high-power state 632 to the low-power state 630 in association with the DRX cycles 634, 636.

At operation 704, the UE may determine if the first power state is to be extended. If the UE determines that the first power state is not to be extended, the UE may return to operation 702 to await subsequent DRX cycles. However, if the UE determines that the first power state is to be extended, the UE may proceed to subsequent operations of the method 700. In the context of FIG. 4, the application 422 may determine that the first power state is to be extended; that is, the application 422 may determine that the L2 layer 408 (e.g., the MAC sublayer 410) is not to cause the transition to the second power state. In the context of FIG. 6, the UE 606 may perform operation 615, at which the UE 606 may determine that the high-power state 632 of the UE 606 is to be extended. For example, the UE 606 may anticipate and/or desire reception of a response to the request 640 before another active cycle 636.

In an aspect of the method 700, operation 704 may comprise one or more of operations 712, 714, 716, 718, 720. According to one aspect, the UE may transmit a request, as illustrated at operation 712. In the context of FIG. 4, the application 422 may transmit a request or may detect transmission of a request. In the context of FIG. 6, the UE 606 may transmit the request 640.

In various aspects, the method 700 may include an operation 718 for starting a timer after the transmitting of the request. In the context of FIG. 4, the application 422 may start a timer at the application layer 420 in association with the determination that the first power state is to be extended. In the context of FIG. 6, the UE 606 may start the second timer in association with the determination that the high-power state 632 of the UE 606 is to be extended (wherein the first timer may be set at a lower layer, such as the L2 layer 408, according to a parameter provided by the base station 604).

In an aspect in which the method 700 is performed at a lower layer (e.g., at the L2 layer 408 and/or by a baseband processor) or the layer (e.g., the application layer 420) performing the method 700 is able to interface with the L2 layer (e.g., the MAC sublayer 410) of the UE, the method 700 may include an operation 714, at which the UE may obtain a duration of an inactivity timer associated with DRX (e.g., by accessing a parameter indicating the duration of the inactivity timer at the L2 layer 408). Subsequently, the UE may set a duration of the timer based on the obtained duration of the inactivity timer, as illustrated at operation 716.

At operation 720, the UE may detect expiration of the timer. Detected expiration of the timer may indicate to the UE that the UE will transition to a second state unless the first power state is extended. In various aspects, expiration of the timer may be signaled as an interrupt or may be detected by polling the state of the timer.

In one aspect of the method 700, the UE may generate a transaction to extend the first power state based on the determination that the first power state is to be extended, as illustrated at operation 705. In the context of FIG. 4, the application 422 may generate a transaction. In the context of FIG. 6, the UE 606 may generate the transaction 660, for example, in connection with operation 615.

According to one aspect of operation 705, the UE may ping a gateway, for example, to inform a base station that the UE is active and will remain in the first power state. Thus, at operation 722, the UE may determine an IP address of a gateway. At operation 724, the UE may generate a ping that includes the determined IP address of the gateway.

At operation 706, the UE may autonomously extend the first power state through transmission of the transaction based on the determination that the first power state of the UE is to be extended. In various aspects, the UE does not negotiate with a base station to extend a duration of the first power state, during which data may be received by the UE from the base station. Rather, the UE may assume that the transaction informs the base station that UE will remain in the first power state to continue to receive data from the base station.

In the context of FIG. 4, the application 422 may cause transmission of the transaction. In the context of FIG. 6, the UE 606 may transmit the transaction to the base station 604. In other aspects, the UE may transmit the transaction to another wireless communication device, such as another UE, an IoT UE, and/or an MTC UE. Transmission of the transaction may indicate that the UE is still active and will remain in the first power state, for example, in anticipation of a response to a request. Thus, following operation 706, the UE may receive data, such as a response to a request (e.g., a request transmitted in association with operation 712).

In various aspects, the method 700 may include an operation 708 at which the UE may determine that the UE is to transition to the second power state. For example, the UE may determine that the UE is to transition to the second power state when no requests are awaiting responses, when there are no high-priority requests awaiting responses, when at least one sufficient response (e.g., a response that causes at least a portion of a web page to become interactive) is received, and the like. In the context of FIG. 4, the application 422 may determine that the L2 layer 408 (e.g., the MAC sublayer 410) is to cause the transition to the second power state. In the context of FIG. 6, the UE 606 may determine that the UE 606 is to transition to the low-power state 630 at operation 620.

According to one aspect, operation 708 may include at least operations 730, 732. At operation 730, the UE may receive one or more responses, such as a subset of responses to one or more pending requests. At operation 732, the UE may determine if at least one sufficient response is received. In the context of FIG. 4, the application 422 may determine that a sufficient response or plurality of responses is received and, therefore, the L2 layer 408 (e.g., the MAC sublayer 410) may cause the transition to the second power state. In the context of FIG. 6, the UE 606 may determine that the response 646 is a sufficient response for the current operation of the UE 606 and, therefore, the UE 606 may transition to the low-power state 630. If a sufficient response is received, the method 700 may proceed to operation 710.

In an alternative aspect of operation 708, operation 708 may include at least operations 736, 738. At operation 736, the UE may determine a number of transactions that have been transmitted by the UE in order to extend the first power state of the UE. At operation 738, the UE may compare the determined number of transactions to a predefined threshold. In the context of FIG. 4, the application 422 may maintain a count of the number of transactions transmitted to extend the first power state, and the application 422 may compare the number of number of transactions to a threshold. In the context of FIG. 6, the UE 606 may maintain a count of the number of transactions transmitted to extend the high-power state 632 (including the transaction 660) and the UE 606 may compare the number of transactions to a threshold. Based on comparison of the determined number of transactions to the threshold, the method 700 may proceed to operation 710, e.g., where the determined number of transactions meets or exceeds the threshold.

At operation 710, the UE may refrain from transmitting additional transactions based on the determination that the UE is to transition to the second power state. In the context of FIG. 4, the application 422 may refrain from transmitting additional transactions based on the determination that the L2 layer 408 (e.g., the MAC sublayer 410) is to cause the transition to the second power state. In the context of FIG. 6, the UE 606 may refrain from transmitting additional transactions based on the determination that the UE 606 is to transition to the low-power state 630.

As will be appreciated, the method 700 may repeat, as DRX cycles repeat for the UE performing the method 700. For example, the UE may perform one or more operations of the method 700 during each active cycle of DRX cycles.

Figure 8:
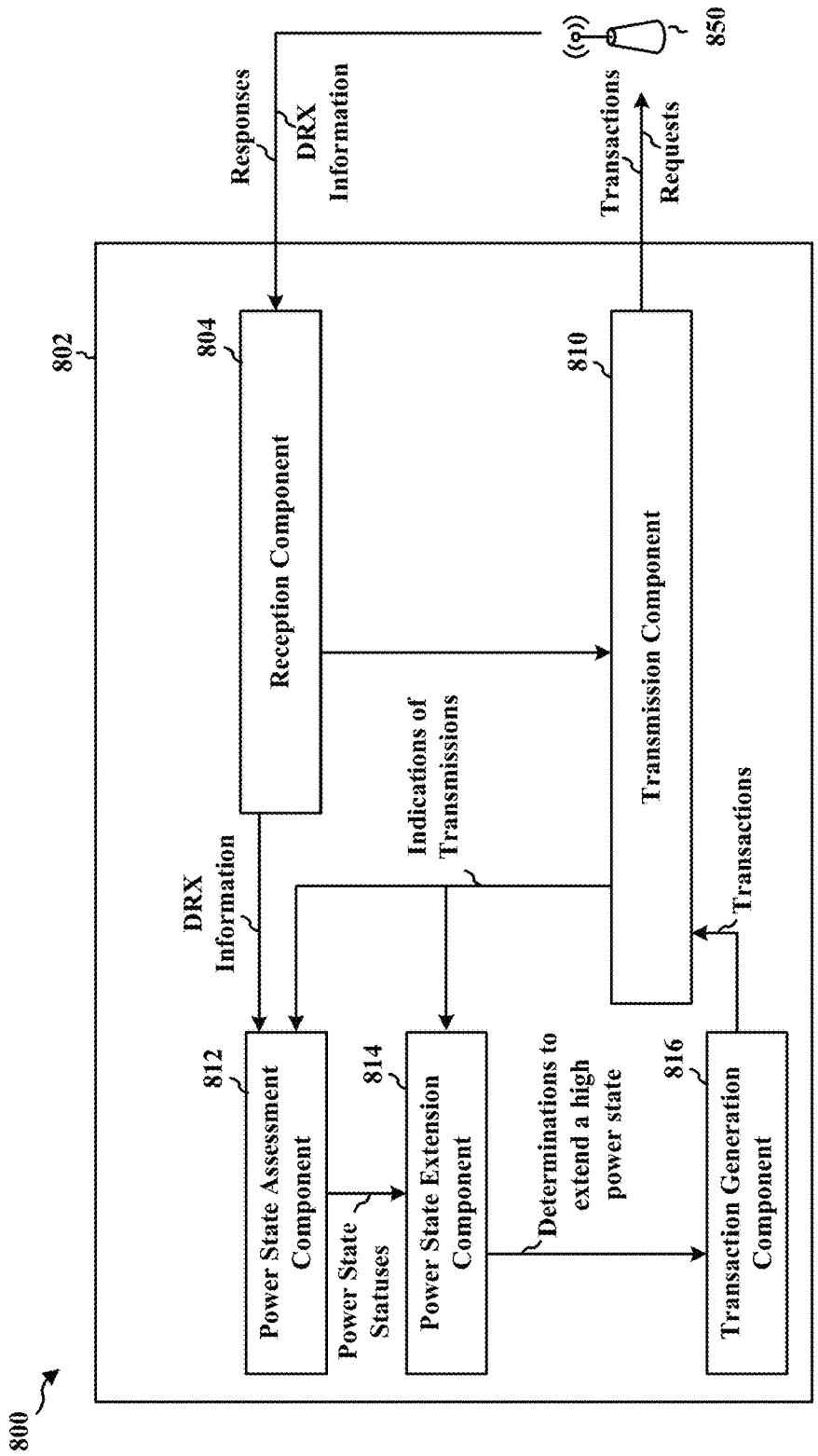
FIG. 8 is a conceptual data flow diagram illustrating the data flow between different means/components in an exemplary apparatus.

With reference to FIG. 8, a conceptual data flow diagram 800 illustrates the data flow between different means/components in an exemplary apparatus 802. The apparatus 802 may implement a protocol architecture, such as the protocol architecture 400 of FIG. 4. The apparatus 802 may be a UE, such as the UE 606 of FIG. 6. The apparatus 802 depicts exemplary connections and/or data between different modules/means/components. It is to be understood that such connections and/or data flow are to be regarded in as illustrative and, therefore, different and/or additional connections and/or data flow may be present in different aspects.

The apparatus 802 may include a reception component 804. The reception component 804 may receive signals from a base station and/or a wireless device (e.g., the base station 850). In an aspect, the reception component 804 may receive information associated with DRX, such as one or more DRX parameters, for example, from the base station 850. In another aspect, the reception component 804 may receive responses to requests transmitted by the apparatus 802, such as responses associated with one or more Internet resources (e.g., HTTP responses, HTTPS responses, HTTP2 responses, TCP responses, or DNS responses).

The apparatus 802 may include a power state assessment component 812. In one aspect, the power state assessment component 812 may be configured to receive indications of transmissions from the transmission component 810, such as requests and/or transactions transmitted by the transmission component 810. Based on one or more indications that the transmission component 810 is transmitting signals, the power state assessment component 812 may determine whether the apparatus 802 is scheduled to transition from a high-power state to a low-power state (e.g., an L2 layer of the apparatus 802 may be scheduled to cause a receive chain of the apparatus 802 to transition from a high-power state to a low-power state in association with DRX). In an aspect, the power state assessment component 812 may estimate a time until a scheduled transition from a high-power state to a low-power state, e.g., based on a timer.

In one aspect, the power state assessment component 812 may receive signals through the reception component 804 from a base station (e.g., the base station 850), such as DRX information. The power state assessment component 812 may be communicatively coupled with or included in an L2 layer (e.g., a MAC sublayer) of the apparatus 802. Based on the received DRX information, the power state assessment component 812 may determine whether the apparatus 802 is scheduled to transition from a high-power state to a low-power state.

The power state assessment component 812 may provide an indication of the status of the power state of the apparatus 802 to a power state extension component 814. The power state assessment component 812 may indicate the power state status of the apparatus 802 as an indication that the apparatus 802 is scheduled to transition from a high-power state to a low-power state. Based on the indication of the power state status, the power state extension component 814 may determine whether a high-power state of the apparatus 802 is to be extended.

In various aspects, the power state extension component 814 may determine that a high-power state of the apparatus 802 is to be extended based on one or more operations performed by the apparatus 802. For example, a specific application operating at the apparatus 802 may indicate a desire to extend the high-power state of the apparatus 802. In another aspect, the power state extension component 814 may be aware that a response to a transmitted request is pending and may determine that the high-power state of the apparatus 802 is to be extended based on the pending request (e.g., a pending request may include an indication that the request is urgent or of a high priority). In another aspect, the power state extension component 814 may determine that the high-power state of the apparatus is to be extended based on an estimated time to reception of a response to a request.

The power state extension component 814 may indicate, to a transaction generation component 816, a determination that a high-power state of the apparatus 802 is to be extended. Based on such an indication, the transaction generation component 816 may generate a transaction to inform the base station 850 that the apparatus 802 is active and is to remain in a high-power state. In various aspects, the transaction generation component 816 may generate a ping, an ARP request, or a message to the base station 850, among other transactions. The transaction generation component 816 may provide the transaction to a transmission component 810.

Collectively, the power state assessment component 812, the power state extension component 814, and the transaction generation component 816 may autonomously extend a high-power state of the apparatus 802. In aspects, the components of the apparatus 802 do not negotiate with the base station 850 to extend the high-power state. For example, the transaction (and transmission thereof) causes a DRX timer (e.g., a DRX timer at the MAC sublayer of an L2 layer) to restart and informs the base station 850 of the same. Consequently, the base station 850 continues transmission of data to the apparatus 802 because the base station 850 is informed that the apparatus 802 is not transitioning to a low-power state.

The transmission component 810 may be configured to transmit signals to a base station 850. For example, the transmission component 810 may be configured to transmit generated transactions and/or requests (e.g., requests for Internet resources) to the base station 850. The transmission component 810 may be communicatively coupled with one or more other components of the apparatus 802, such as the power state assessment component 812 and/or the power state extension component 814. Through such communicative coupling, the transmission component 810 may indicate to other components that the apparatus 802 is transmitting signals (e.g., requests and/or transactions).

The apparatus 802 may include additional components that perform each of the operations of the algorithm in the aforementioned flowchart of FIG. 7. As such, each operation in the aforementioned flowchart of FIG. 7 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
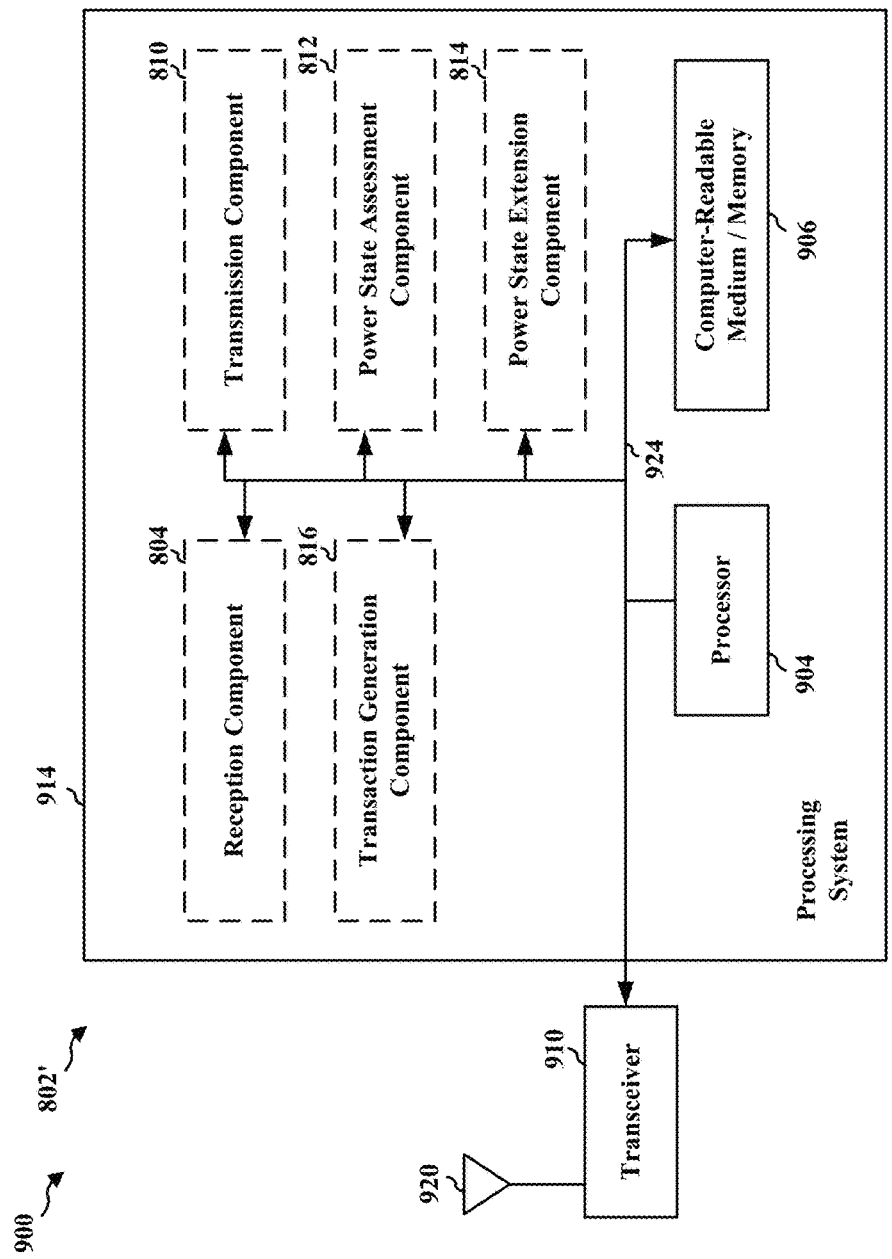
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 810, 812, 814, 816, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described herein for any particular apparatus. In one aspect, the processor 904 may be an application processor. In another aspect, the processor 904 may be a baseband processor. In another aspect, the processor 904 may be a general purpose processor that is configured to execute processes associated with a baseband processor and an application processor. The computer-readable medium/memory 906 may also be used for storing data that is manipulated by the processor 904 when executing software. The processing system 914 further includes at least one of the components 812, 814, 816. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining that the apparatus 802/802' is scheduled to transition from a first power state to a second power state in association with a DRX cycle. In one aspect, the second power state may be lower than the first power state. The apparatus 802/802' may further include means for determining that the first power state of the apparatus 802/802' is to be extended. The apparatus 802/802' may further include means for autonomously extending the first power state through transmission of a transaction based on the determination that the first power state of the apparatus 802/802' is to be extended. In an aspect, the DRX cycle is CDRX. In an aspect, the apparatus 802/802' further includes means for generating a transaction based on the determination that the first power state is to be extended. In an aspect, the apparatus 802/802' further includes means for transmitting the transaction to a base station. In an aspect, the transaction comprises a ping to a gateway, an ARP request, or a message intended for a base station.

In an aspect, the means for determining that the first power state of the apparatus 802/802' is to be extended is configured to start a timer after transmission of a request. In an aspect, the means for determining that the first power state of the apparatus 802/802' is to be extended is configured to detect the expiration of the timer. In an aspect, the means for determining that the first power state of the apparatus 802/802' is to be extended is configured to make the determination based on the detected expiration of the timer. In an aspect, a duration of the timer is less than a duration of an inactivity timer associated with the DRX cycle.

In an aspect, the apparatus 802/802' may further include means for obtaining, from an L2 layer of the apparatus 802/802', a duration of an inactivity timer associated with the DRX cycle. In an aspect, the apparatus 802/802' further includes means for setting a duration of the timer based on the duration of the inactivity timer.

In an aspect, the request, after which the means for determining that the first power state of the apparatus 802/802' is to be extended is configured to start the timer, is one of a HTTP request, a HTTPS request, a HTTP2 request, a TCP request, or a DNS request. In an aspect, apparatus 802/802' further includes means for determining that the apparatus 802/802' is to transition to the second power state.

In an aspect, the means for autonomously extending the first power state through transmission of a transaction is configured to refrain from transmission of additional transactions based on the determination that the apparatus 802/802' is to transition to the second power state.

In an aspect, the apparatus 802/802' further includes means for transmitting a request before the transmission of the transaction. In an aspect, the apparatus 802/802' further includes means for receiving a subset of responses of a plurality of responses associated with the request. In an aspect, the means for determining that the apparatus 802/802' is to transition to the second power state is configured to determine that a sufficient response has been received based on the received subset of responses. In an aspect, the determination that the apparatus 802/802' is to transition to the second power state is based on the determination that the sufficient response has been received.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   determining that the UE is scheduled to transition from a first power state to a second power state in association with a discontinuous reception cycle, the second power state being lower than the first power state;
   determining that the first power state of the UE is to be extended when a response from a base station to a request transmitted by the UE is unreceived; and
   extending the first power state through transmission of a transaction based on the determination that the first power state of the UE is to be extended.

2. The method of claim 1, wherein the discontinuous reception cycle is a connected-state discontinuous reception cycle (CDRX).

3. The method of claim 1, further comprising:
   generating a transaction based on the determination that the first power state is to be extended; and
   transmitting the transaction to a base station.

4. The method of claim 1, wherein the transaction comprises a ping, and wherein the method further comprises:
   determining an Internet protocol (IP) address of a gateway; and
   generating the ping to include the IP address of the gateway.

5. The method of claim 1, wherein the transaction comprises an Address Resolution Protocol (ARP) request or a message intended for a base station.

6. The method of claim 1, wherein the determination that the first power state of the UE is to be extended is based on expiration of a timer, and the method further comprises:
   transmitting the request;
   starting the timer after the transmission of the request; and
   detecting the expiration of the timer when the response to the request is unreceived.

7. The method of claim 6, wherein a duration of the timer is less than a duration of an inactivity timer associated with the discontinuous reception cycle.

8. The method of claim 6, the method further comprising:
   obtaining, from a Layer 2 (L2 layer) of the UE, a duration of an inactivity timer associated with the discontinuous reception cycle; and
   setting a duration of the timer based on the duration of the inactivity timer.

9. The method of claim 6, wherein a duration of the timer is based on an estimated time to receive the response to the request.

10. The method of claim 6, further comprising:
    restarting the timer when the response to the request is undetected;
    detecting expiration of the restarted timer; and
    transmitting a second transaction based on the detection of the expiration of the restarted timer.

11. The method of claim 6, wherein the request is one of a Hyper Text Transfer Protocol (HTTP) request, a HTTP Secure (HTTPS) request, a HTTP2 request, a Transmission Control Protocol (TCP) request, or a Domain Name System (DNS) request.

12. The method of claim 1, further comprising:
determining that the UE is to transition to the second power state; and
refraining from transmission of additional transactions based on the determination that the UE is to transition to the second power state.

13. The method of claim 12, further comprising:
transmitting the request before the transmission of the transaction;
receiving a subset of responses of a plurality of responses associated with the request; and
determining that a sufficient response has been received based on the received subset of responses,
wherein the determination that the UE is to transition to the second power state is based on the determination that the sufficient response has been received.

14. An apparatus for wireless communication, the apparatus comprising:
means for determining that the apparatus is scheduled to transition from a first power state to a second power state in association with a discontinuous reception cycle, the second power state being lower than the first power state;
means for determining that the first power state of the apparatus is to be extended when a response from a base station to a request transmitted by the apparatus is unreceived; and
means for extending the first power state through transmission of a transaction based on the determination that the first power state of the apparatus is to be extended.

15. The apparatus of claim 14, wherein the discontinuous reception cycle is a connected-state discontinuous reception cycle (CDRX).

16. The apparatus of claim 14, further comprising:
means for generating a transaction based on the determination that the first power state is to be extended; and
means for transmitting the transaction to a base station.

17. The apparatus of claim 14, wherein the transaction comprises a ping to a gateway, an Address Resolution Protocol (ARP) request, or a message intended for a base station.

18. The apparatus of claim 14, wherein the means for determining that the first power state of the apparatus is to be extended is configured to start a timer after transmission of the request and detect expiration of the timer, and wherein the means for determining that the first power state of the apparatus is to be extended is configured to determine that the first power state is to be extended based on the detected expiration of the timer.

19. The apparatus of claim 18, wherein a duration of the timer is less than a duration of an inactivity timer associated with the discontinuous reception cycle.

20. The apparatus of claim 18, further comprising:
means for obtaining, from a Layer 2 (L2 layer) of the apparatus, a duration of an inactivity timer associated with the discontinuous reception cycle; and
means for setting a duration of the timer based on the duration of the inactivity timer.

21. The apparatus of claim 18, wherein the request is one of a Hyper Text Transfer Protocol (HTTP) request, a HTTP Secure (HTTPS) request, a HTTP2 request, a Transmission Control Protocol (TCP) request, or a Domain Name System (DNS) request.

22. The apparatus of claim 14, further comprising:
means for determining that the apparatus is to transition to the second power state, wherein the means for extending the first power state through transmission of a transaction is configured to refrain from transmission of additional transactions based on the determination that the apparatus is to transition to the second power state.

23. The apparatus of claim 22, further comprising:
means for transmitting the request before the transmission of the transaction; and
means for receiving a subset of responses of a plurality of responses associated with the request,
wherein the means for determining that the apparatus is to transition to the second power state is configured to determine that a sufficient response has been received based on the received subset of responses and the determination that the apparatus is to transition to the second power state is based on the determination that the sufficient response has been received.

24. An apparatus for wireless communication, the apparatus comprising:
a memory; and
at least one processor coupled to the memory and configured to:
determine that the apparatus is scheduled to transition from a first power state to a second power state in association with a discontinuous reception cycle, the second power state being lower than the first power state;
determine that the first power state of the apparatus is to be extended when a response from a base station to a request transmitted by the apparatus is unreceived; and
extend the first power state through transmission of a transaction based on the determination that the first power state of the apparatus is to be extended.

25. The apparatus of claim 24, wherein the discontinuous reception cycle is a connected-state discontinuous reception cycle (CDRX).

26. The apparatus of claim 24, wherein the at least one processor is further configured to:
generate a transaction based on the determination that the first power state is to be extended; and
transmit the transaction to a base station.

27. The apparatus of claim 24, wherein the at least one processor is further configured to:
transmit the request;
start a timer after transmission of the request; and
detect the expiration of the timer,
wherein the determination that the first power state of the UE is to be extended is based on the detected expiration of the timer.

28. The apparatus of claim 24, wherein the at least one processor is further configured to:
determine that the apparatus is to transition to the second power state; and
refrain from transmission of additional transactions based on the determination that the apparatus is to transition to the second power state.

29. The apparatus of claim 28, wherein the at least one processor is further configured to:
transmit the request before the transmission of the transaction;
receive a subset of responses of a plurality of responses associated with the request; and
determine that a sufficient response has been received based on the received subset of responses,
wherein the at least one processor is configured to determine that the apparatus is to transition to the second power state based on the determination that the sufficient response has been received.

30. A non-transitory computer-readable medium storing computer-executable code of a user equipment (UE) for wireless communication, comprising code to:
- determine that the UE is scheduled to transition from a first power state to a second power state in association with a discontinuous reception cycle, the second power state being lower than the first power state;
- determine that the first power state of the UE is to be extended when a response from a base station to a request transmitted by the UE is unreceived; and
- extend the first power state through transmission of a transaction based on the determination that the first power state of the UE is to be extended.

* * * * *